Patented Aug. 8, 1933

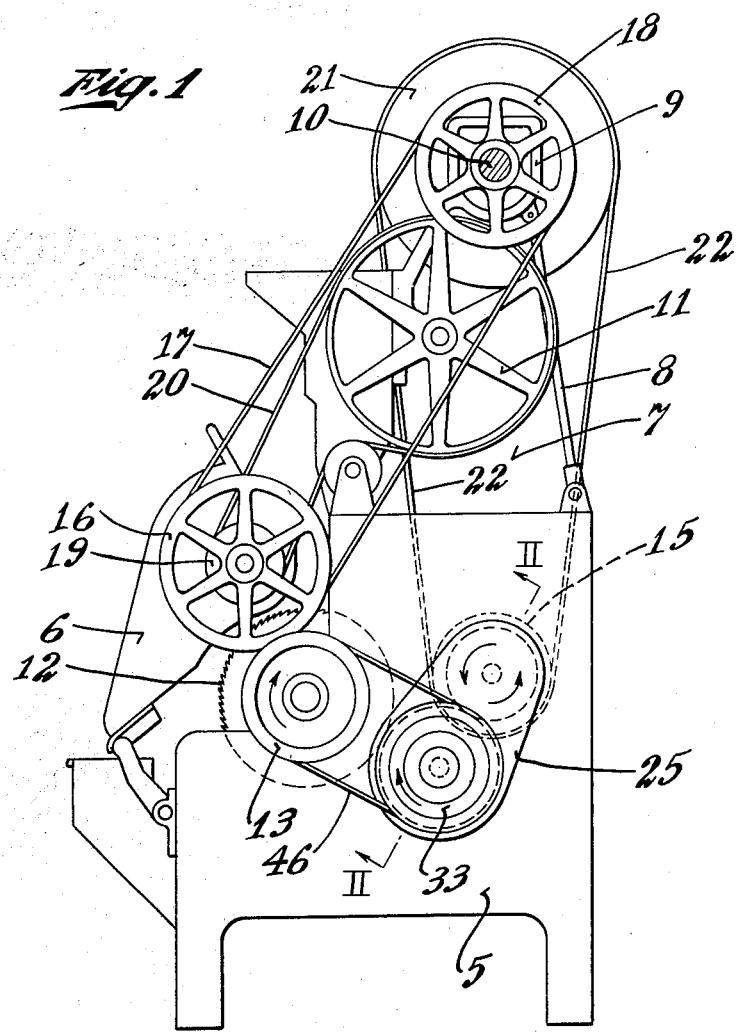

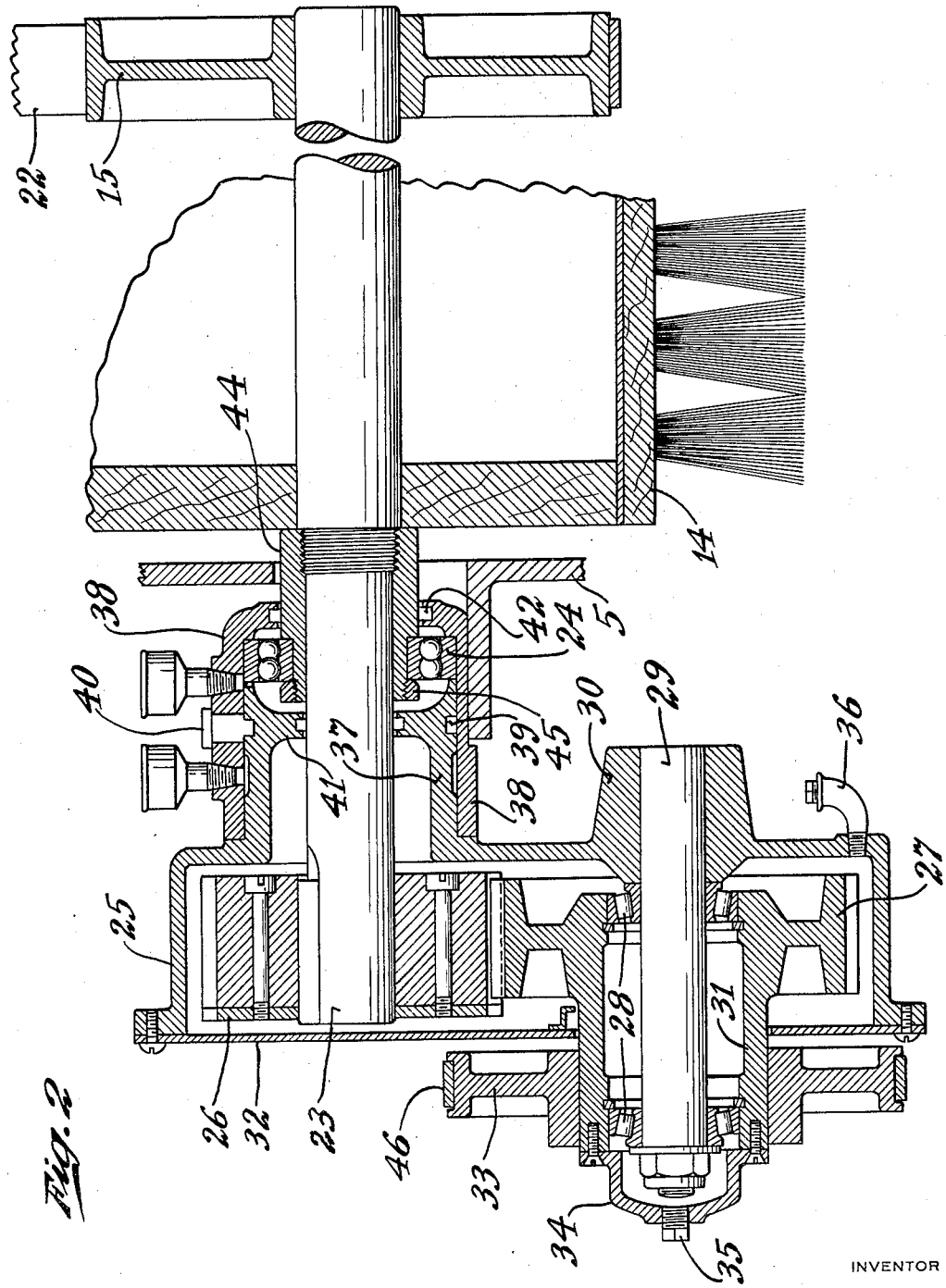

1,921,311

UNITED STATES PATENT OFFICE 1,921,311

LINTER GIN DRIVE

Frank E. Deems, Birmingham, Ala., assignor to Continental Gin Company, a Corporation of Delaware Application May 11, 1931. Serial No. 536,529

9 Claims. (Cl. 19—55)

My invention relates to an improved drive mechanism for linter gins and the like, its chief object being to render easy and simple the removal of the driving belt of the saw cylinder so that frequent changes of the latter can be accomplished with the greatest ease and facility.

In considering the application of my invention to linter gins, it is necessary to understand that these gins embody three essential rotating elements, namely, the saw cylinder, the brush and the float which are all driven from an overhead line shaft, the saw cylinder being driven in one direction and the brush and the float being independently driven in the opposite direction to the saw cylinder.

As generally practiced heretofore the saw cylinder is driven from a line shaft pulley by a belt long enough to be crossed, though sometimes it is driven by what is termed a serpentine belt drive. The float shaft usually has pulleys at both ends driven by open belts from separate line shaft pulleys. The brush shaft is driven by an open belt from its line shaft pulley. Customarily the saw cylinder drive belt is arranged at one end of the linter and the brush drive belt at the other end. There is normally no occasion to disturb the drive to the brush or float, but since the saw cylinder has to be removed and changed every few hours, it is a matter of prime importance that its drive should permit of its ready removal, though as a matter of fact this is not so easily accomplished with the present drives.

In changing the saw cylinder, the general practice is to throw the cross belt off of the overhead pulley on the line shaft, after which it can be disengaged from the saw cylinder pulley and then the saw cylinder can be removed. This would not appear to present any complications, but if the line shaft on which the saw cylinder's pulley is located is set low enough, i. e., close enough to the saw cylinder, to permit of the belt being readily reached and thrown off or on to its drive pulley, then it will be found that it is too close to the saw cylinder pulley for a cross drive belt to work satisfactorily. On the other hand, if the overhead line shaft be sufficiently elevated to provide ample distance from the saw cylinder pulley for a cross belt to be practically used, then obviously the pulley on the line shaft becomes increasingly inaccessible, making it more and more difficult to throw the belt off and replace it on the line shaft pulley when changing the saw cylinders.

Where the serpentine belt drive for the saw cylinder is employed, it is well known that it is both dangerous and troublesome to throw the belt off to permit interchange of saw cylinders.

The object of my present invention is to design a drive for linter gins in which the driving elements are so arranged and related to each other that an operator can, with the greatest ease, change the saw cylinders and I accomplish this without the employment of a direct driving belt from the overhead line shaft to the saw cylinder.

More particularly, my invention contemplates taking the drive for the saw cylinder off of the brush shaft, preferably arranging the drive to the saw cylinder at the opposite end of the brush shaft from that receiving the drive from the overhead shaft.

Further, my invention contemplates the employment of a floating pulley driven from the brush shaft and connected by a short open driving belt with the saw cylinder pulley, the floating pulley being adapted to permit this belt to be eased in the simplest possible manner when it is desired to remove and replace the belt.

My invention further contemplates designing the floating drive for the saw cylinder drive belt so that it will automatically and in proportion to the load thereon tighten reversely that driving belt as the load comes on it, this being accomplished by mounting the driving pulley for the saw cylinder on a bearing swung from the brush shaft as an axis and gear driven therefrom with the thrust from the meshing gears tending to swing the bearing away from the brush shaft and thereby to tighten the belt, at the same time leaving the bearing free to be readily swung by hand toward the saw cylinder to ease the belt and permit it to be thrown off of the saw cylinder pulley.

My invention further comprises the novel details of construction and arrangements of parts, which will be better understood by reference to the accompanying drawings which form a part of this specification, and in which:—

Fig. 1 is an end elevation of a linter gin equipped with my improved driving mechanism.

Fig. 2 is an enlarged detail view taken on the line II—II of Fig. 1 and showing both ends of the brush shaft with the brush cylinder broken away.

Similar reference numerals refer to similar parts throughout the drawings.

In the embodiment of my invention illustrated, I show conventionally a linter gin comprising end frames 5 with a hinged breast 6 and a feed hopper 7 carrying brackets 8 which support suitable bearings 9 for an overhead drive shaft 10.

The internal mechanism of this linter gin, being of standard construction, need not be shown or described further than to state that its feeder mechanism in the feed hopper is adapted to be driven by the feeder drum 11; its saw cylinder 12 has a driving pulley 13; its brush cylinder 14 is driven by the pulley 15; and its float is driven by pulleys 16 at each end thereof. These float pulleys are driven by open belts 17 from flanged pulleys 18 fast on the drive shaft 10. A pulley 19 on the brush shaft by means of the open belt 20 drives the feeder pulley 11. A pulley 21 on the drive shaft 10, by means of an open belt 22, drives the brush pulley 15.

The linter parts, and the drives therefor as thus far described, are all standard and may be varied without departure from my invention which is concerned more particularly with a new and improved drive for the saw cylinder pulley 13 which will now be described.

Referring more particularly to Fig. 2 it will be seen that the brush shaft has one end 23 which projects beyond the roller bearing 24 therefor in the frame 5 and is received in a floating gear case 25 which houses a pinion 26 fast on the brush shaft. This pinion meshes a pinion 27 fast on a sleeve 31 mounted by means of roller bearings 28 upon a stud shaft 29 that is mounted fixedly in a boss 30 in the underhung portion of the floating gear case 25. The gear 27 is housed within the gear case 25 but the sleeve 31 extends through a suitable opening in the side plate 32 that closes the gear case and on the exposed outer end of the sleeve I mount fast a flanged pulley 33.

A suitable cap 34 closes the outer end of the sleeve 31 and has an oil plug 35 therein. An oil drain 36 is provided in the bottom of the gear case 25 which at its top has a cylindrical sleeve or rocker bearing element 37 that is mounted to rotate in the bearing housing 38 for the roller bearing 24. This sleeve 37 has a circumferential channel 39 which receives a pin 40 in the bearing 38, the pin serving to permit the gear case to rock freely in its bearing 38 about the brush shaft as an axis while holding it against axial displacement. The sleeve 37 carries suitable bearing elements 41 and 42 which coact respectively with the brush shaft extension 23 and with the sleeve 44 that is screwed on the shaft 23 and carries the inner race of the bearing 24. The outer race of said bearing is made fast in the bearing housing 38. The roller bearing elements are held in place by a retainer ring 45 screwed on the threaded end of the sleeve 44.

A short open belt 46 passes from the grooved floating pulley 33 to the saw cylinder pulley 13 and this constitutes my improved floating drive to the saw cylinder.

From the foregoing it will be seen that from the line shaft pulley 21 the reverse drive to the saw cylinder is transmitted through belt 22 and pulley 15 to the brush shaft 23 and thence through gearing 26 and 27 and sleeve 31 to the floating drive pulley 33 and thence by the short open belt 46 to the saw cylinder. To change the saw cylinder it is only necessary to swing the gear case 25 clockwise about shaft 23 toward the saw cylinder, thereby easing belt 46 and permitting it to be readily thrown off the saw cylinder pulley 13. After the saw cylinder has been changed the pulley 33 can in like manner be swung toward pulley 13, permitting the ready replacement of the belt 46 and then the drive is ready for service. The pulley and its swinging drive is so hung that it at all times keeps tension on the belt 46 which increases under driving conditions.

It will be noted by reference to the arrows in Fig. 1 that the thrust from the driving pinion 26 imparted to the pinion 27 mounted in the gear case will tend to rotate the gear case in a counter-clockwise direction about the brush shaft as an axis. This movement of the gear case is resisted only by the belt 46 which drives the saw cylinder. It follows that tension is thus automatically placed upon this belt 46 when it is being driven from the pinion 26 and that such tension will be in proportion to the power required to drive the saw cylinder. I thus obtain an easy removal and automatic tension adjustment of a short open driving belt for a saw cylinder by having the hanger supporting the driving element of the belt mounted free to rock towards and from the saw cylinder pulley.

Obviously the floating drive can be placed at either end of the brush shaft, the end remote from the pulley 15 being selected as being most convenient of application. The driving belt 46 may be of any type and its pulleys 13 and 33 are preferably flanged.

While I have shown my invention in but one form, it will be obvious to those skilled in the art that it is not so limited, but is susceptible of various changes and modifications, without departing from the spirit thereof, and I desire, therefore, that only such limitations shall be placed thereupon as are imposed by the prior art or as are specifically set forth in the appended claims.

What I claim is:—

1. In a drive for linter gins having a brush shaft and a removable saw cylinder with pulley, comprising a drive means for the brush shaft, and a floating drive from the brush shaft to the saw cylinder pulley comprising a driving element fast on the brush shaft, means reversely driven thereby and mounted to swing toward and from the saw cylinder, and an open belt to transmit motion from said swinging means to the saw cylinder.

2. A drive for linter gins according to claim 1, in which the swinging means is mounted in a bearing free to rock about the brush shaft and carries a driving pulley for the open belt that drives the saw cylinder.

3. A drive for linter gins having a brush shaft and a removable saw cylinder with pulley, comprising a drive means for the brush shaft, and a floating drive from the brush shaft to the saw cylinder pulley comprising a gear train having one gear mounted on the brush shaft and one reversely driven by the first mentioned gear and mounted in a bearing free to rock about the brush shaft, a pulley fast to the latter gear, and an open belt for driving the saw cylinder from said pulley, the gear train having a direction of motion imparted thereto from the brush shaft adapted to apply tension to said driving belt for the saw cylinder.

4. In a linter gin having an overhead drive shaft, a brush shaft, a drive between said shafts, a bearing underhung from and mounted to rock about the brush shaft, a pinion fast on the brush shaft, a driven pinion meshing the first mentioned pinion and rotatable on said bearing, a pulley operatively connected to said driven pinion, a saw cylinder having a pulley, and a short open belt connecting said pulleys.

5. A drive for linter gins, comprising a brush shaft having a power drive means, a saw cylinder having a pulley, a gear train driven from the brush shaft and comprising a driven pinion, a bearing support therefor swung from the brush shaft, a pulley driven by said driven pinion and adapted to swing therewith toward and from the saw cylinder, and a short open belt forming a driving connection between said latter pulley and the saw cylinder pulley, the gearing being driven in a direction to impart tension to said belt.

6. A drive for linter gins, comprising a brush shaft having a power drive means at one end and having its other end extended to overhang beyond the linter gin, a saw cylinder having a pulley, a gear train driven from the overhung end of the brush shaft and comprising a driving pinion fast on said end of the brush shaft, a driven pinion, a bearing support therefor swung from the brush shaft, a pulley driven by said drive pinion and adapted to swing therewith toward and from the saw cylinder, and a short open belt forming a driving connection between said latter pulley and the saw cylinder pulley, the gearing being driven in a direction to impart tension to said belt proportionate to the load on the saw cylinder.

7. In a drive for linter gins having a brush shaft and a removable saw cylinder having a driving pulley, a drive means for the brush shaft, and a floating drive from the brush shaft to the saw cylinder pulley comprising an open drive belt which is freely releasable from the saw cylinder pulley by moving the floating drive towards the saw cylinder.

8. In a drive for linter gins having a brush shaft and a removable saw cylinder, a drive means for the brush shaft, and a floating drive from the brush shaft to the saw cylinder comprising a swinging pulley driven reversely from the brush shaft, and a short open belt driven from said swinging pulley to the saw cylinder, said swinging pulley being mounted to impose by gravity tension on said belt at all times.

9. In a drive for linter gins having a float shaft with end pulleys, a brush shaft with a pulley fast on one end and a saw cylinder with a fast pulley on one end thereof, an overhead line shaft having pulleys and open belts to drive said float pulleys and said brush pulley, a floating reversing gear drive on the end of the brush shaft adjacent to the pulley on the saw cylinder, a pulley driven by said floating drive and mounted free to swing towards the saw cylinder, and a short open belt for driving the saw cylinder pulley from the floating drive pulley under tension from the floating gear drive, the floating pulley being freely movable towards the saw cylinder to facilitate the removal of said open drive belt from, and its replacement on, said saw cylinder pulley.

FRANK E. DEEMS.